(12) United States Patent
Han et al.

(10) Patent No.: US 12,558,856 B2
(45) Date of Patent: Feb. 24, 2026

(54) DEVICE AND METHOD FOR AUTOMATICALLY REMOVING MARGINS OF RUBBER SEALING RINGS IN HIGH-ACCURACY

(71) Applicant: CHENGDU HOLY AVIATION SCIENCE TECHNOLOGY CO., LTD., Chengdu City (CN)

(72) Inventors: Chen Han, Chengdu City (CN); Jicheng Wang, Chengdu City (CN); Qun Zhou, Chengdu City (CN); Xiaofeng Zhang, Chengdu City (CN); Hongzhong Tu, Chengdu City (CN); Hansong Zou, Chengdu City (CN); Zanping Zhang, Chengdu City (CN); Baitao Zhang, Chengdu City (CN); Rongqian Mo, Chengdu City (CN); Jian Gong, Chengdu City (CN); Wenjie Peng, Chengdu City (CN); Zhiming Liu, Chengdu City (CN); Hong Liu, Chengdu City (CN)

(73) Assignee: CHENGDU HOLY AVIATION SCIENCE TECHNOLOGY CO., LTD., Chengdu City (CN)

( * ) Notice: Subject to any disclaimer, the term of this patent is extended or adjusted under 35 U.S.C. 154(b) by 0 days.

(21) Appl. No.: 17/897,847

(22) Filed: Aug. 29, 2022

(65) Prior Publication Data

US 2023/0219302 A1 Jul. 13, 2023

(30) Foreign Application Priority Data

Jan. 10, 2022 (CN) .......................... 202210022577.7

(51) Int. Cl.
  *B29C 69/00* (2006.01)
  *B29C 33/22* (2006.01)
  (Continued)

(52) U.S. Cl.
  CPC ............ *B29C 69/001* (2013.01); *B29C 33/22* (2013.01); *B29C 37/02* (2013.01);
  (Continued)

(58) Field of Classification Search
  CPC ............ B29C 37/02; B29C 2045/0077; B29D 99/0082–0085; B29L 2031/265; B29L 2031/7096–7102
  See application file for complete search history.

(56) References Cited

FOREIGN PATENT DOCUMENTS

CN 107791421 A * 3/2018
CN 108995101 A * 12/2018
(Continued)

OTHER PUBLICATIONS

Translation of CN-107791421-A (Year: 2018).*
(Continued)

*Primary Examiner* — John J DeRusso
(74) *Attorney, Agent, or Firm* — MUNCY, GEISSLER, OLDS & LOWE, P.C.

(57) ABSTRACT

A device for automatically removing margins of rubber sealing rings in high-precision includes a vibrating plate, an installation platform, a motor assembly and a core rod, wherein the motor assembly is arranged on the lower part of the installation platform, the core rod is arranged above the motor assembly, the core rod is a metal rod, the top of which is tapered, a clamping apparatus, an auxiliary apparatus and a margin-removing apparatus are arranged beside the core rod, a product-conveying belt and a buffer conveyor belt are arranged on the installation platform, one side of the core rod far away from the product-collecting box is further provided with an air-pumping apparatus and an air-blowing apparatus. A method for automatically removing margins of rubber sealing rings in high-precision includes: automati-
(Continued)

cally positioning, removing outer margins, removing inner margins step-by-step and automatically collecting.

7 Claims, 5 Drawing Sheets

(51) Int. Cl.

| | | |
|---|---|---|
| *B29C 37/00* | (2006.01) | |
| *B29C 37/02* | (2006.01) | |
| *B29D 99/00* | (2010.01) | |
| *B29K 21/00* | (2006.01) | |
| *B29L 31/26* | (2006.01) | |

(52) U.S. Cl.
CPC ...... *B29D 99/0085* (2013.01); *B29C 2037/90* (2013.01); *B29K 2021/00* (2013.01); *B29L 2031/265* (2013.01)

(56) References Cited

FOREIGN PATENT DOCUMENTS

| CN | 109203318 A | * | 1/2019 | ......... B29C 45/0053 |
|---|---|---|---|---|
| CN | 109291344 B | * | 3/2021 | ............. B29C 37/02 |
| CN | 113442353 A | * | 9/2021 | |
| CN | 113502007 A | * | 10/2021 | |

OTHER PUBLICATIONS

Translation of CN-108995101-A (Year: 2018).*
Translation of CN-109203318-A (Year: 2019).*
Translation of CN-109291344-B (Year: 2021).*
Translation of CN-113442353-A (Year: 2021).*
Translation of CN-113502007-A (Year: 2021).*
Miki Pulley, "What Are Electromagnetic Clutches and Electromagnetic Brakes? Their Types and Structures", <https://www.mikipulley.co.jp/EN/Products/ElectoromagneticClutchesAndBrakes/about.html> (Year: 2021).*

* cited by examiner

101

102

103

104

501

502

503

504

601

602

603

604

607

608

605

606

701

702

703

704

705

706

707

DEVICE AND METHOD FOR AUTOMATICALLY REMOVING MARGINS OF RUBBER SEALING RINGS IN HIGH-ACCURACY

FIELD OF THE INVENTION

Background of the Invention

When molding and vulcanizing rubber products, it is usually necessary to fill the mold cavity with an excessive amount of rubber to ensure that the products will not lack in rubber, but this inevitably leads to the generation of vulcanization margins. When we use rubber products, in order to ensure the performance and appearance quality of the products, it is necessary to remove the margins generated during mold molding and vulcanization. At present, there are several methods for removing margins that are commonly used in the industry as follows. 1. Manual removal, that is, a tool with a cutting edge or a friction surface with a certain roughness is used to manually remove margins. This method is a traditional method for removing margins that has most widely used, with such an advantage as enable to remove a variety of regular and irregular rubber product margins and such a disadvantage as not stabilize the removal accuracy due to human factors, and lower the removal efficiency. 2. Frozen deburring art, that is, multiple pieces of rubber products to be removed with margins are put in a low temperature environment to make the margins brittle, so as to remove the margins of the rubber products through a physical process applying a working medium that performs a function of friction or introducing a fine-grained spray medium, with such an advantage as improve the margin removal efficiency and such a disadvantage as difficultly control the removal accuracy, that is, while a large removal force inevitably causes more or less influence on the appearance quality of the base material, a small removal force affects the margin removal efficiency.

SUMMARY OF THE INVENTION

In order to achieve the above object, the present invention provides the following technical solutions:

A device for automatically removing margins of rubber sealing rings in high-accuracy, comprising a vibrating plate, an installation platform, a motor assembly and a core rod, wherein the vibrating plate and the installation platform are closely connected with each other and arranged on the ground;

the motor assembly is arranged on the lower part of the installation platform;

the core rod is arranged above the motor assembly; the core rod is a metal rod, the top of which is tapered;

a clamping apparatus, an auxiliary apparatus and a margin-removing apparatus are arranged beside the core rod;

both the clamping apparatus and the margin-removing apparatus are a linear sliding platform mechanism with two degrees of freedom in a X-axis and a Z-axis;

the auxiliary apparatus is a linear sliding platform mechanism in a Z-axis;

a product-conveying belt and a buffer conveyor belt are arranged on the installation platform: the product-conveying belt and the buffer conveyor belt are positioned between the vibrating plate and the core rod;

a first photoelectric sensor is arranged beside the product-conveying belt; a second photoelectric sensor is arranged beside the buffer conveyor belt;

a product-collecting box is also arranged beside the core rod, and a first baffle and a second baffle are arranged on both sides of the product-collecting box and the core rod;

one side of the core rod far away from the product-collecting box is further provided with an air-pumping apparatus and an air-blowing apparatus.

Optionally or preferably, the vibrating plate includes a top disc, a bottom disc and a base, which are arranged in order from top to bottom, and a material flow channel is arranged on the top disc.

Optionally or preferably, the motor assembly includes a motor platform, a motor connecting apparatus and a motor body; the motor platform is arranged in the opening of the installation platform; the motor body is positioned below the motor platform, and installed and fixed on the installation platform by means of the motor connecting apparatus, which is composed of two L-shaped connecting pieces.

Optionally or preferably, the core rod includes, from top to bottom, an upper zone tapered to some extent, an outer margin-removing zone with an outer diameter slightly larger than the inner diameters of products, an inner margin-removing zone with a certain roughness and a lower zone, a core rod magnet is arranged inside the lower zone and used to cooperate with the motor magnet.

Optionally or preferably, the clamping apparatus includes a first Z-axis sliding rail, a first X-axis sliding rail, a clamper mounting seat, a clamping cylinder connecting plate and a clamping cylinder;

the first Z-axis sliding rail is a sliding rail arranged in the vertical direction, and installed and fixed on the installation platform by means of the clamper mounting seat, a first Z-axis motor is arranged at the top of the first Z-axis sliding rail;

the first X-axis sliding rail is a sliding rail arranged in a horizontal direction, and installed on the first Z-axis sliding rail, one end of the first X-axis sliding rail far away from the core rod is provided with an first X-axis motor, a first X-axis sliding block is further arranged on the first X-axis sliding rail, the clamping cylinder is fixed on the first X-axis sliding block by means of the clamping cylinder connecting plate;

the first X-axis sliding rail is driven by the first Z-axis motor and can move up and down along the first Z-axis sliding rail, the clamping cylinder is driven by the first X-axis motor and can move left and right along the first X-axis sliding rail.

Optionally or preferably, the auxiliary apparatus includes an auxiliary sliding rail, an auxiliary head connecting plate, an auxiliary head, an electromagnetic apparatus, a rotary disc and an auxiliary apparatus mounting seat;

the auxiliary sliding rail is a sliding rail arranged in a vertical direction, and installed and fixed on the installation platform by means of the auxiliary apparatus mounting seat, an auxiliary motor is arranged at the top of the auxiliary sliding rail;

the auxiliary head is installed on the auxiliary sliding rail by means of the auxiliary head connecting plate, and driven by the auxiliary motor to move up and down along the auxiliary sliding rail, the electromagnetic apparatus is arranged in the middle part of the auxiliary head, the lower part of the auxiliary head is provided with the rotary disc.

Optionally or preferably, the margin-removing apparatus includes a second Z-axis sliding rail, a second X-axis sliding rail, a second X-axis sliding block, a grinding head connecting block, an upper grinding head, a lower grinding head, a force sensor, and a margin-removing installation seat;

the second Z-axis sliding rail is a slide rail arranged in the vertical direction, and installed and fixed on the installation platform by means of the margin-removing installation seat, a second Z-axis motor is arranged at the top of the second Z-axis sliding rail;

the second X-axis sliding rail is a sliding rail arranged in a horizontal direction, and installed on the second Z-axis sliding rail, one end of the second X-axis sliding rail far away from the core rod is provided with a second X-axis motor, the second X-axis sliding block is further arranged on the second X-axis slide rail, both the upper grinding head and the lower grinding head are fixed on the second X-axis sliding block by means of the grinding head connecting block.

the second X-axis sliding rail is driven by the second Z-axis motor and can move up and down along the second Z-axis sliding rail, the force sensor controlling the positional accuracy of the grinding heads is arranged beside both the upper grinding head and the lower grinding head, the second X-axis sliding block is driven by the second X-axis motor and can move left and right along the second X-axis sliding rail.

The present invention further provides a method for removing margins of rubber sealing rings based on the device for automatically removing margins of rubber sealing rings in high-accuracy, comprising the following steps:

S1. putting semi-products to be removed with margins into the vibrating plate, and placing the core rod corresponding to specifications on the rotary disc of the motor platform of the motor assembly;

S2. starting the vibrating plate, the semi-products being driven by the vibrating plate, and delivered to the product-conveying belt in queue;

S3. delivering the semi-products to be removed with margins through the product-conveying belt to the buffer conveyor belt, and the buffer conveyor belt and the photoelectric sensor jointly operating to enable a single semi-product to be placed at a fixed position on the buffer conveyor belt;

S4. the clamping cylinder of the clamping apparatus clamping the semi-product over the core rod and then releasing it, the semi-product falling to the upper zone of the core rod;

S5. moving the clamping cylinder and the lower grinding head to both sides of the core rod, and the spacing distance between the lower outer edge of the clamping cylinder and the lower outer edge of the lower grinding head being slightly larger than the diameter of the core rod, and no interference with the core rod happening during the downward movement of the clamping cylinder;

S6. the clamping cylinder moving downwards with the lower grinding head, and driving the semi-product to move downwards along the core rod to the outer margin-removing zone;

S7. the clamping cylinder moving to the left, the lower grinding head moving to the right, the auxiliary head of the auxiliary apparatus moving downwards and molding the core rod, the motor assembly starting to operate and driving the core rod to rotate;

S8. the lower grinding head touching and being grinded into the outer margins of the semi-product, the grinding force between the lower grinding head and the semi-product functioning to remove the outer margins, at this time, the air-pumping apparatus starting to operate to pump out the flying chips generated during removing margins;

S9. after completing removing margins, the motor assembly continuing to operate, and the lower grinding head moving to the right and separating itself from the outer side of the semi-product;

S10. the clamping cylinder moving to the right, the lower grinding head moving to the upper left, until the spacing distance between the lower outer edge of the clamping cylinder and the lower outer edge of the lower grinding head is slightly larger than the diameter of the core rod, and no interference with the core rod happening during the downward movement of the clamping cylinder, at this time, the lower outer edge of the clamping cylinder and the lower outer edge of the lower grinding head being positioned above the semi-product;

S11. the clamping cylinder moving downwards with the lower grinding head, driving the semi-product to move down along the core rod to the inner margin-removing zone, enabling the inner margins to be preliminarily removed;

S12, the clamping cylinder moving to the left, and the lower grinding head moving to the right until it separates itself from the semi-product;

S13. the upper grinding head touching and being grinded into the outer margins of the semi-product, the grinding force between the inner margin-removing zone and the semi-product functioning to further remove the inner margins;

S14. after removing the inner margins, the air-pumping apparatus stopping operating, the motor assembly stopping operating, the electromagnetic apparatus in the auxiliary head being energized to operate and adsorbing the core rod, the clamping cylinder moving to the right, the lower grinding head moving to the upper left, until the spacing distance between the lower outer edge of the clamping cylinder and the lower outer edge of the lower grinding head is slightly larger than the diameter of the core rod, and no interference with the core rod happening during the downward movement of the clamping cylinder, at this time, the lower outer edge of the clamping cylinder and the lower outer edge of the lower grinding head being positioned above the semi-product;

S15. the auxiliary head driving the core rod to move upwards, the lower outer edge of the clamping cylinder and the lower outer edge of the lower grinding head jointly functioning to fall a product removed with margins onto the motor platform from the core rod;

S16. the air-blowing apparatus starting to operate to blow the product to the product-collecting box;

S17. after the auxiliary apparatus driving the core rod to reset downward, the electromagnetic apparatus stopping operating, the clamping apparatus, the auxiliary apparatus and the margin-removing apparatus returning to the position at no operation; and S18. repeating S2~S18 to enable multiple semi-products to be continuously automatically removed with margins.

Wherein: 1—vibrating plate; 101—top disc; 102—material flow channel; 103—bottom disc; 104—base; 2—product-conveying belt; 3—buffer conveyor belt; 4—installation platform; 401—first baffle; 402—second baffle; 5—motor assembly; 501—motor platform; 502—motor magnet; 503—motor connecting apparatus; 504—motor body; 6—clamping apparatus; 601—first Z-axis motor; 602—first Z-axis sliding rail; 603—first X-axis sliding rail; 604—first X-axis motor; 605—first X-axis sliding block; 606—clamper mounting seat; 607—clamping cylinder connecting plate; 608—clamping cylinder; 7—auxiliary apparatus; 701—auxiliary motor; 702—auxiliary sliding rail; 703—auxiliary head connecting plate; 704—auxiliary head; 705—electromagnetic apparatus; 706—rotary disc; 707—auxiliary apparatus mounting seat; 8—margin-removing apparatus; 801—second Z-axis motor; 802—second Z-axis sliding rail; 803—second X-axis motor; 804—second X-axis slide rail; 805—second X-axis sliding block; 806—grinding head connecting block; 807—upper grinding head; 808—lower grinding head; 809—force sensor; 810—margin-removing installation seat; 9—the core rod; 901—upper zone; 902—outer margin-removing zone; 903—inner margin-removing zone; 904—lower zone; 905—core rod magnet; 10—product-collecting box; 11—air-pumping apparatus; 12—air-blowing apparatus; 13—first photoelectric sensor; 14—second photoelectric sensor.

DETAILED DESCRIPTION OF SOME EMBODIMENTS

Example 1

Figure 1:
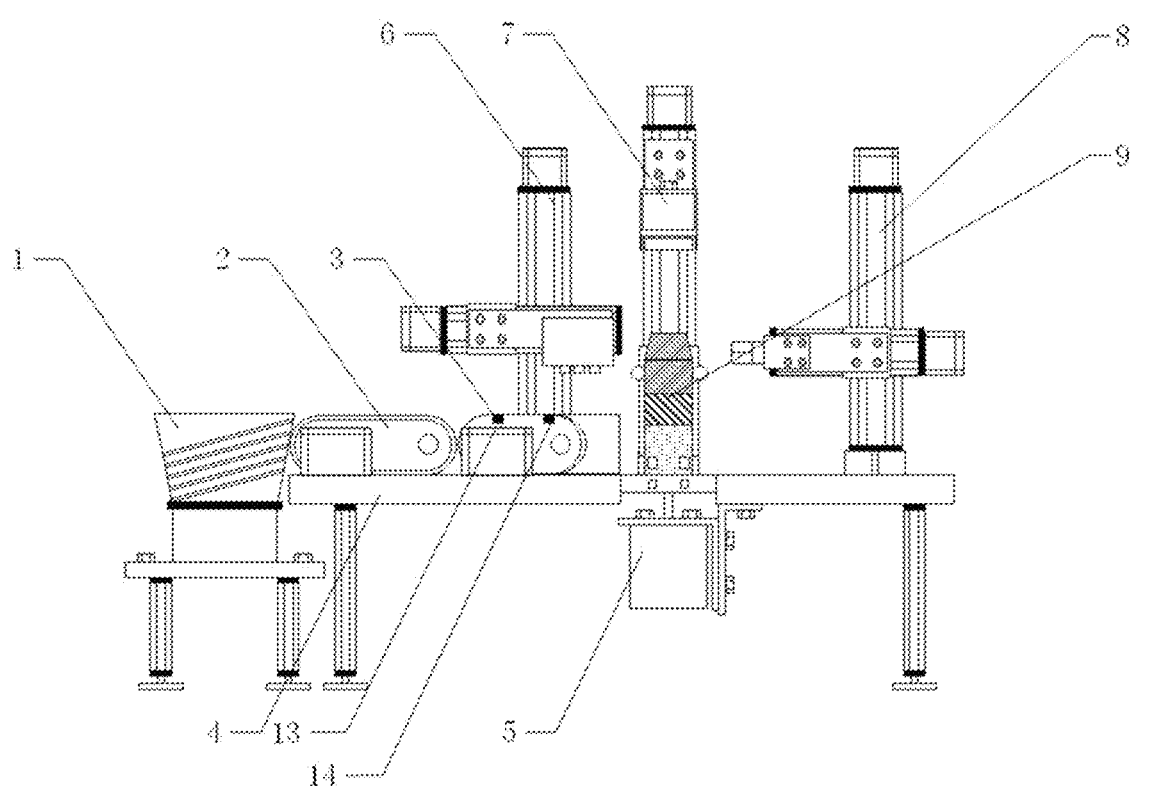
FIG. 1 is a front view of the present invention.
Figure 2:
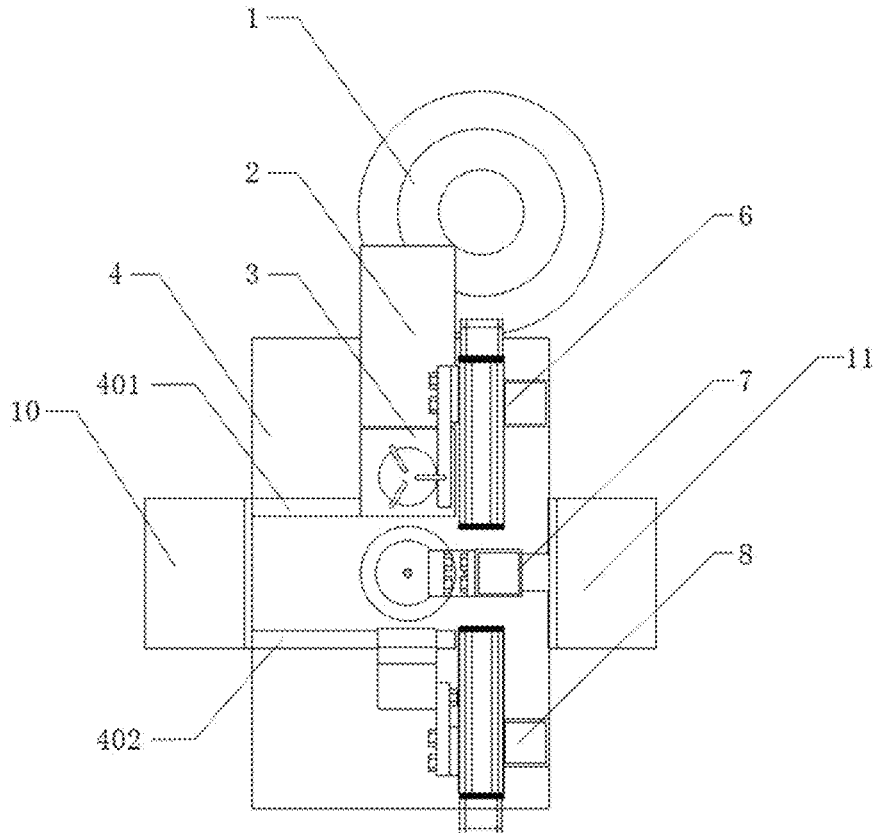
FIG. 2 is a top view of the present invention.
Figure 3:
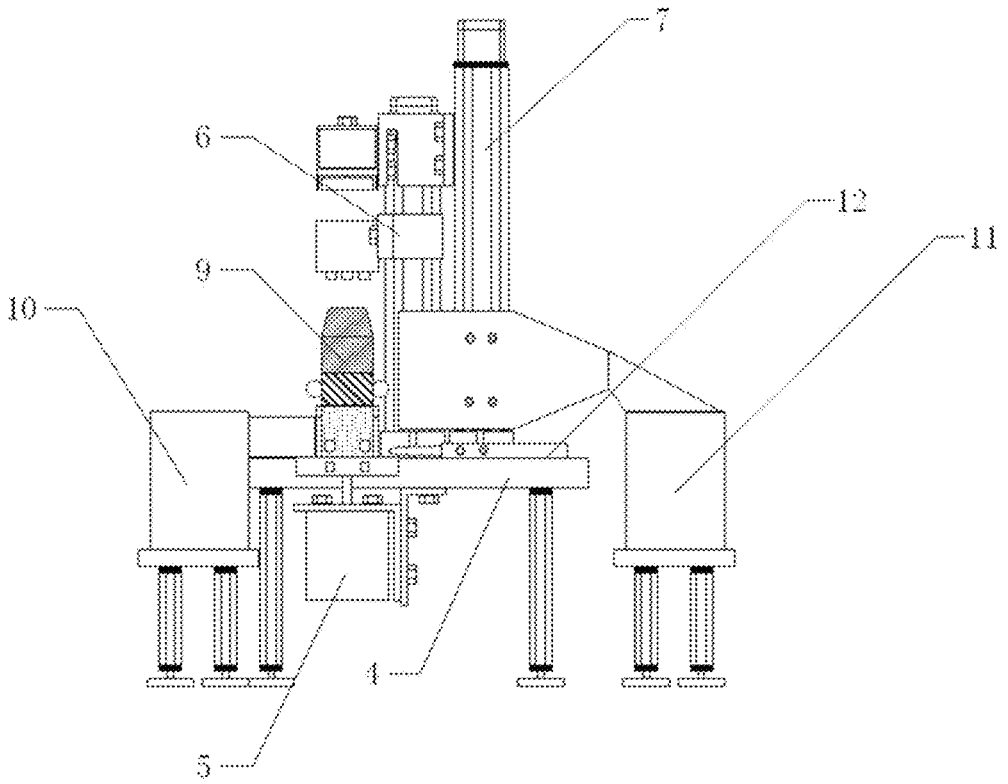
FIG. 3 is a right view of the present invention (not shown the margin-removing apparatus).
Figure 4:
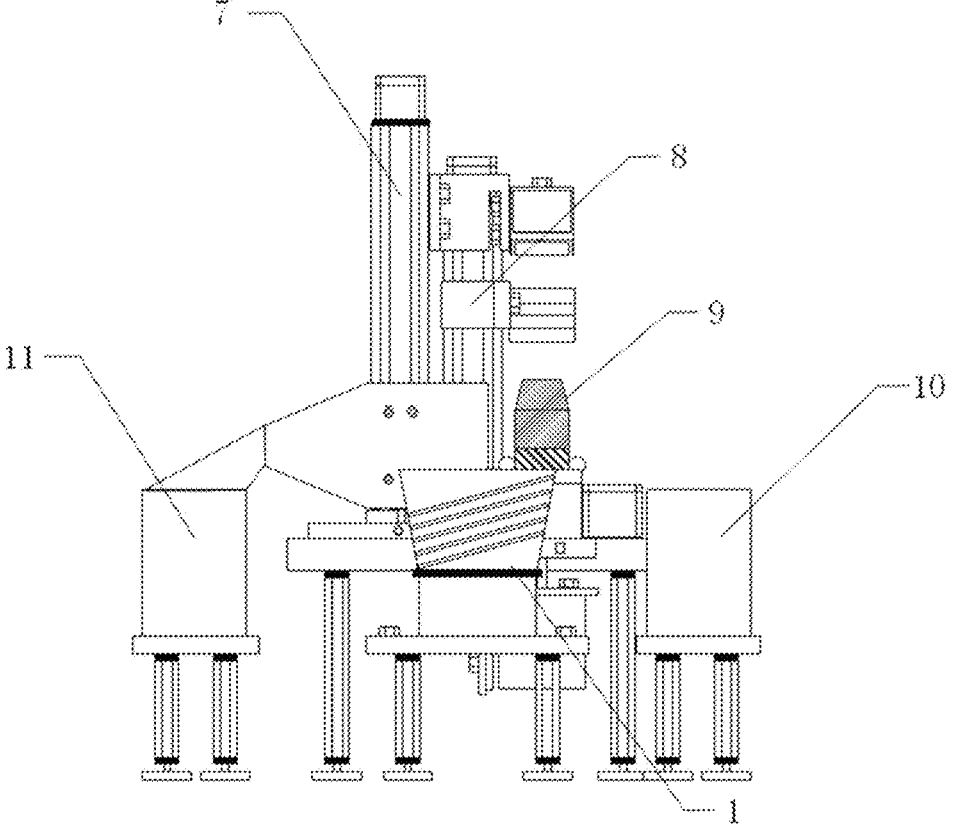
FIG. 4 is a left view of the present invention (not shown the clamping apparatus).
Figure 5:
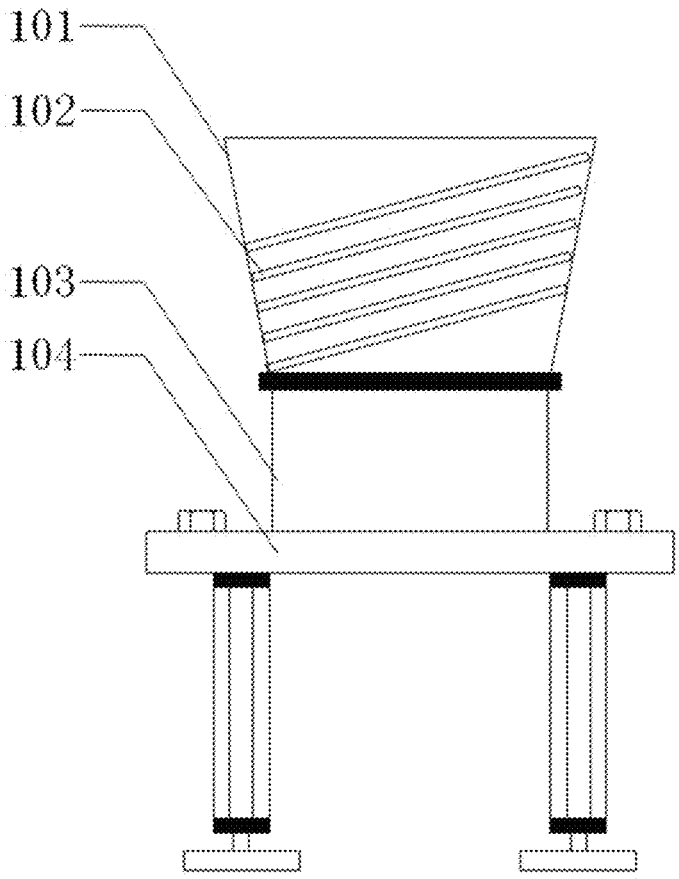
FIG. 5 is a structure diagram of the vibrating plate of the present invention.
Figure 6:
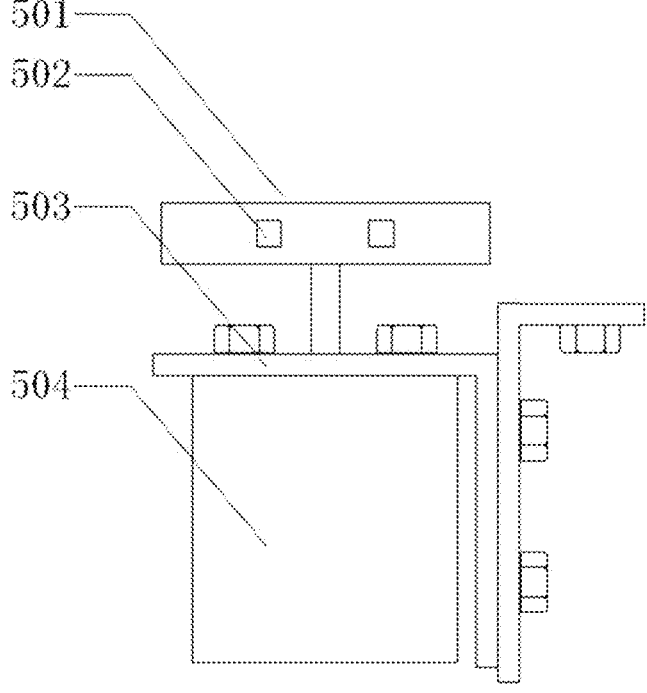
FIG. 6 is a structure diagram of the motor assembly of the present invention.
Figure 7:
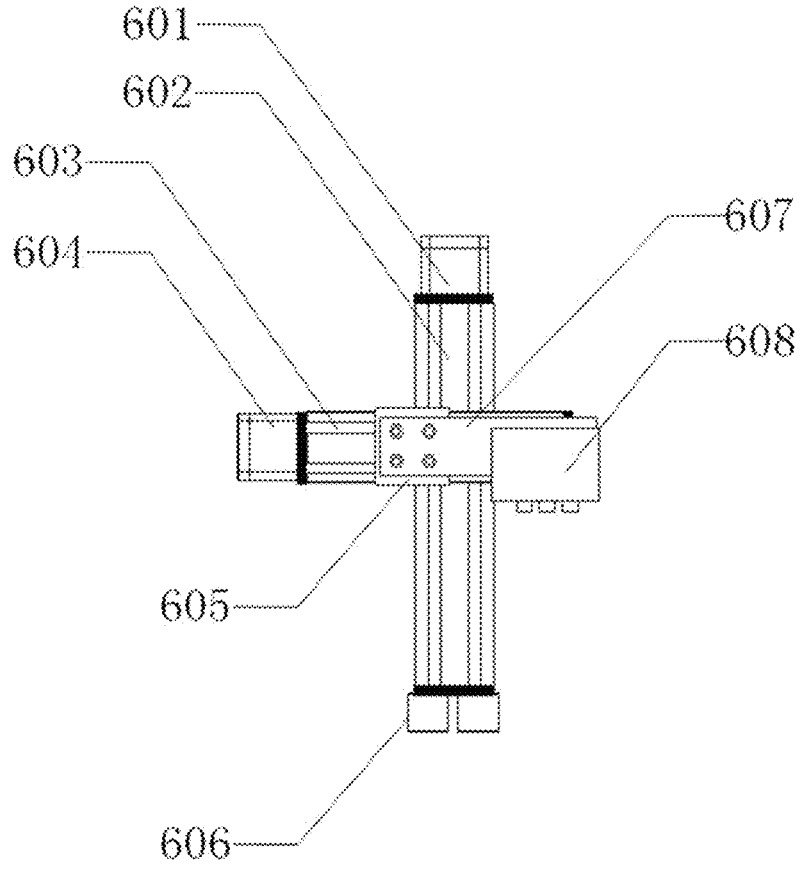
FIG. 7 is a structure diagram of the clamping apparatus of the present invention.
Figure 8:
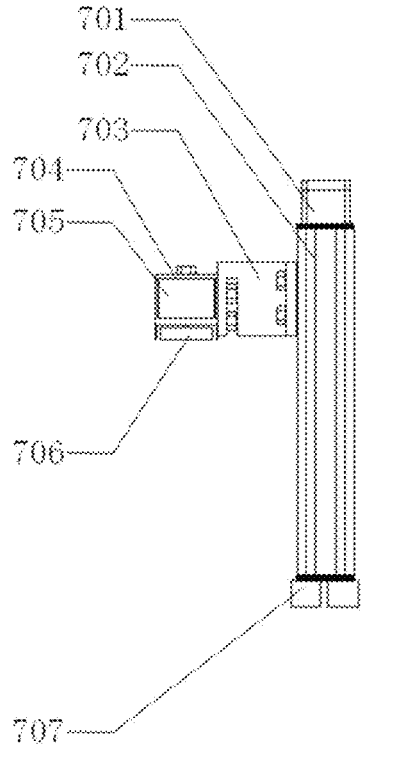
FIG. 8 is a structure diagram of the auxiliary apparatus of the present invention.
Figure 9:
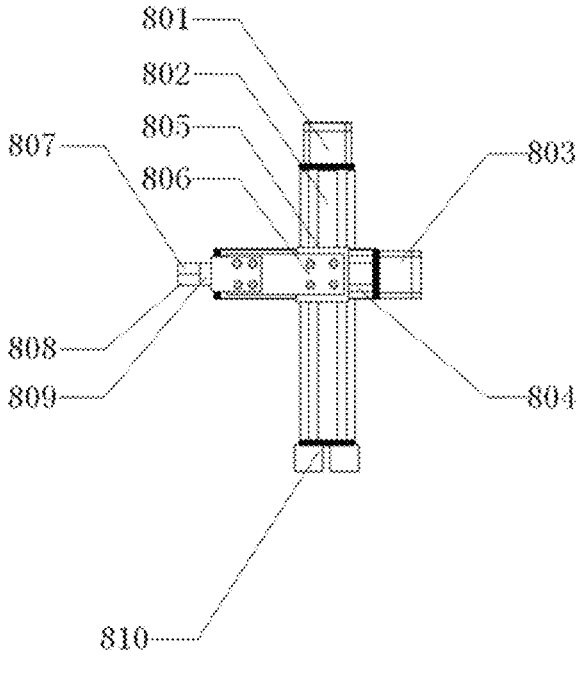
FIG. 9 is a structure diagram of the margin-removing apparatus of the present invention.
Figure 10:
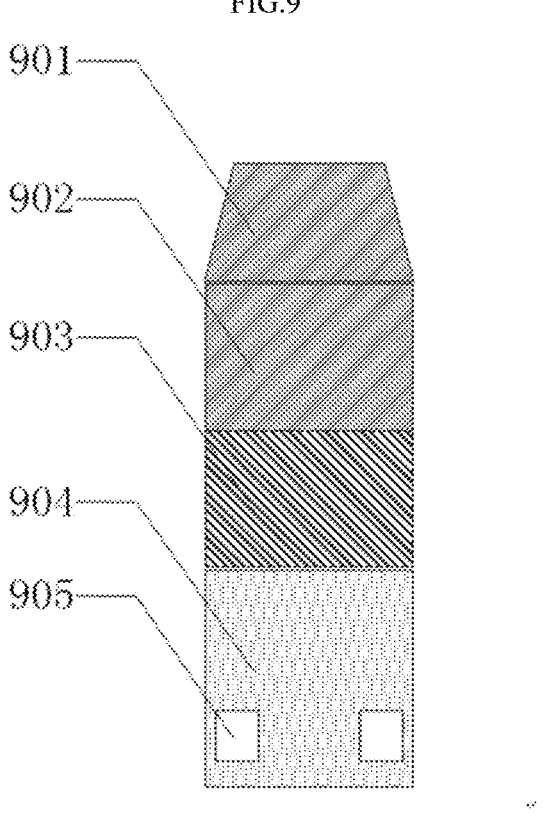
FIG. 10 is a structure diagram of the core rod of the present invention.

As shown in FIG. 1-10:

The present invention provides a device for automatically removing margins of rubber sealing rings in high-accuracy, which includes a vibrating plate 1, an installation platform 4, a motor assembly 5 and a core rod 9, wherein the vibrating plate 1 and the installation platform 4 are closely connected with each other and arranged on the ground;

the motor assembly 5 is arranged on the lower part of the installation platform 4;

the core rod 9 is arranged above the motor assembly 5; the core rod 9 is a metal rod, the top of which is tapered;

a clamping apparatus 6, an auxiliary apparatus 7 and a margin-removing apparatus 8 are arranged beside the core rod 9;

both the clamping apparatus 6 and the margin-removing apparatus 8 are a linear sliding platform mechanism with two degrees of freedom in a X-axis and a Z-axis;

the auxiliary apparatus 7 is a linear sliding platform mechanism in a Z-axis;

a product-conveying belt 2 and a buffer conveyor belt 3 are arranged on the installation platform 4; the product-conveying belt 2 and the buffer conveyor belt 3 are positioned between the vibrating plate 1 and the core rod 9;

a first photoelectric sensor 13 is arranged beside the product-conveying belt 2; a second photoelectric sensor 14 is arranged beside the buffer conveyor belt 3; the product-conveying belt 2 functions to deliver the products sent from the vibrating plate 1 in queue to the buffer conveyor belt 3; the buffer conveyor belt 3 functions to deliver the products on the product-conveying belt 2 piece by piece to a fixed position, so as to be grabbed by the clamping cylinder 608.

A product-collecting box 10 is also arranged beside the core rod 9, and a first baffle 401 and a second baffle 402 are arranged on both sides of the product-collecting box 10 and the core rod 9; the first baffle 401 and the second baffle 402 function to cooperate with an air-blowing apparatus 12 to enable the products remove with margins to be blown to the product-collecting box 10.

One side of the core rod 9 far away from the product-collecting box 10 is further provided with an air-pumping apparatus 11 and an air-blowing apparatus 12. The air-pumping apparatus 11 functions to pump out flying chips generated during removing margins. The air-blowing apparatus 12 functions to blow the products remove with margins into the product-collecting box 10.

In this example, the vibrating plate 1 includes a top disc 101, a bottom disc 103 and a base 104, which are arranged in order from top to bottom, and a material flow channel 102 is arranged on the top disc 101. The vibrating plate 1 functions to, after putting the rubber ring products to be removed with margins into the top disc 101, vibrate and queue the products, so as to sequentially eject them from the material flow channel 102, and deliver them to the product-conveying belt 2.

In this example, the motor assembly 5 includes a motor platform 501, a motor connecting apparatus 503 and a motor body 504. The motor platform 501 is arranged in the opening of the installation platform 4. The motor body 504 is positioned below the motor platform 501, and installed and fixed on the installation platform 4 through the motor connecting apparatus 503, which is composed of two L-shaped connecting pieces. A motor magnet 502 is arranged inside the motor platform 501, facilitating the positioning and installation of the core rod 9.

In this example, the core rod 9 is a metal rod varying outer diameters and tapered at the top to some extent, and it can be selected and used in the light of the inner diameters of different products. The core rod 9 includes, from top to bottom, an upper zone 901 tapered to some extent, an outer margin-removing zone 902 with an outer diameter slightly larger than the inner diameters of products, an inner margin-removing zone 903 with a certain roughness and a lower zone 904. A core rod magnet 905 is arranged inside the lower zone 904 and used to cooperate with the motor magnet 502.

In this example, the clamping apparatus 6 includes a first Z-axis sliding rail 602, a first X-axis sliding rail 603, a clamper mounting seat 606, a clamping cylinder connecting plate 607 and a clamping cylinder 608.

The first Z-axis sliding rail 602 is a sliding rail arranged in the vertical direction, and installed and fixed on the installation platform 4 by means of the clamper mounting seat 606. A first Z-axis motor 601 is arranged at the top of the first Z-axis sliding rail 602.

The first X-axis sliding rail 603 is a sliding rail arranged in a horizontal direction, and installed on the first Z-axis sliding rail 602. One end of the first X-axis sliding rail 603 far away from the core rod 9 is provided with an first X-axis motor 604. A first X-axis sliding block 605 is further arranged on the first X-axis sliding rail 603. The clamping cylinder 608 is fixed on the first X-axis sliding block 605 by means of the clamping cylinder connecting plate 607.

The first X-axis sliding rail 603 is driven by the first Z-axis motor 601 and can move up and down along the first Z-axis sliding rail 602. The clamping cylinder 608 is driven by the first X-axis motor 604 and can move left and right along the first X-axis sliding rail 603.

In this example, the auxiliary apparatus 7 includes an auxiliary sliding rail 702, an auxiliary head connecting plate 703, an auxiliary head 704, an electromagnetic apparatus 705, a rotary disc 706 and an auxiliary apparatus mounting seat 707.

The auxiliary sliding rail 702 is a sliding rail arranged in a vertical direction, and installed and fixed on the installation platform 4 by means of the auxiliary apparatus mounting seat 707. An auxiliary motor 701 is arranged at the top of the auxiliary sliding rail 702.

The auxiliary head 704 is installed on the auxiliary sliding rail 702 by means of the auxiliary head connecting plate 703, and driven by the auxiliary motor 701 to move up and down along the auxiliary sliding rail 702. The electromagnetic apparatus 705 is arranged in the middle part of the auxiliary head 704, functioning to adsorb the core rod 9 after operation: the lower part of the auxiliary head 704 is provided with the rotary disc 706. In the case that the electromagnetic adsorption force of the electromagnetic apparatus 705 is adjusted to be greater than the magnetic force between the core rod magnet 905 and the motor magnet 502 and the auxiliary head 704 moves upwards, the core rod 9 can be driven to move upwards.

In this example, the margin-removing apparatus 8 includes a second Z-axis sliding rail 802, a second X-axis sliding rail 804, a second X-axis sliding block 805, a grinding head connecting block 806, an upper grinding head 807, a lower grinding head 808, a force sensor 809, and a margin-removing installation seat 810.

The second Z-axis sliding rail 802 is a slide rail arranged in the vertical direction, and installed and fixed on the installation platform 4 by means of the margin-removing installation seat 810. A second Z-axis motor 801 is arranged at the top of the second Z-axis sliding rail 802.

The second X-axis sliding rail 804 is a sliding rail arranged in a horizontal direction, and installed on the second Z-axis sliding rail 802. One end of the second X-axis sliding rail 804 far away from the core rod 9 is provided with the second X-axis motor 803. The second X-axis sliding block 805 is further arranged on the second X-axis slide rail 804. Both the upper grinding head 807 and the lower grinding head 808 are fixed on the second X-axis sliding block 805 by means of the grinding head connecting block 806.

The second X-axis sliding rail 804 is driven by the second Z-axis motor 801 and can move up and down along the second Z-axis sliding rail 802. The force sensor 809 controlling the positional accuracy of the grinding heads is arranged beside both the upper grinding head 807 and the lower grinding head 808. The second X-axis sliding block 805 is driven by the second X-axis motor 803 and can move left and right along the second X-axis sliding rail 804. The force sensor 809 functions to adjust the relative spatial position between both the upper grinding head 807 and the lower grinding head 808 and the rubber ring product, by measuring and feedbacking the pressure value between both the upper grinding head 807 and the lower grinding head 808 and the rubber ring product during operation, so as to achieve precisely adjusting the effect of removing margins.

This example further provides a method for removing margins of rubber sealing rings based on the device for automatically removing margins of rubber sealing rings in high-accuracy according to Example 1, comprising the following steps:

S1. putting semi-products to be removed with margins into the vibrating plate 1, and placing the core rod 9 corresponding to specifications on the rotary disc of the motor platform 501 of the motor assembly 5;

S2. starting the vibrating plate 1, the semi-products being driven by the vibrating plate 1, and delivered to the product-conveying belt 2 in queue;

S3. delivering the semi-products to be removed with margins through the product-conveying belt 2 to the buffer conveyor belt 3, and the buffer conveyor belt 3 and the photoelectric sensor 13 jointly operating to enable a single semi-product to be placed at a fixed position on the buffer conveyor belt 3;

S4. the clamping cylinder 608 of the clamping apparatus 6 clamping the semi-product over the core rod 9 and then releasing it, the semi-product falling to the upper zone 901 of the core rod 9;

S5. moving the clamping cylinder 608 and the lower grinding head 808 to both sides of the core rod 9, and the spacing distance between the lower outer edge of the clamping cylinder 608 and the lower outer edge of the lower grinding head 808 being slightly larger than the diameter of the core rod 9, and no interference with the core rod 9 happening during the downward movement of the clamping cylinder 608;

S6. the clamping cylinder 608 moving downwards with the lower grinding head 808, and driving the semi-product to move downwards along the core rod 9 to the outer margin-removing zone 902;

S7. the clamping cylinder 608 moving to the left, the lower grinding head 808 moving to the right, the auxiliary head 704 of the auxiliary apparatus 7 moving downwards and molding the core rod 9, the motor assembly 5 starting to operate and driving the core rod 9 to rotate;

S8. the lower grinding head 808 touching and being grinded into the outer margins of the semi-product, the grinding force between the lower grinding head 808 and the semi-product functioning to remove the outer margins, at this time, the air-pumping apparatus 11 starting to operate to pump out the flying chips generated during removing margins;

S9. after completing removing margins, the motor assembly 5 continuing to operate, and the lower grinding head 808 moving to the right and separating itself from the outer side of the semi-product;

S10. the clamping cylinder 608 moving to the right, the lower grinding head 808 moving to the upper left, until the spacing distance between the lower outer edge of the clamping cylinder 608 and the lower outer edge of the lower grinding head 808 is slightly larger than the diameter of the core rod 9, and no interference with the core rod 9 happening during the downward movement of the clamping cylinder 608, at this time, the lower outer edge of the clamping cylinder 608 and the lower outer edge of the lower grinding head 808 being positioned above the semi-product;

S11. the clamping cylinder 608 moving downwards with the lower grinding head 808, driving the semi-product to move down along the core rod 9 to the inner margin-removing zone 903, enabling the inner margins to be preliminarily removed;

S12, the clamping cylinder 608 moving to the left, and the lower grinding head 808 moving to the right until it separates itself from the semi-product;

S13. the upper grinding head 808 touching and being grinded into the outer margins of the semi-product, the grinding force between the inner margin-removing zone 903 and the semi-product functioning to further remove the inner margins;

S14. after removing the inner margins, the air-pumping apparatus 11 stopping operating, the motor assembly 5 stopping operating, the electromagnetic apparatus 705 in the auxiliary head 704 being energized to operate and adsorbing the core rod 9, the clamping cylinder 608 moving to the right, the lower grinding head 808 moving to the upper left, until the spacing distance between the lower outer edge of the clamping cylinder 608 and the lower outer edge of the lower grinding head 808 is slightly larger than the diameter of the core rod 9, and no interference with the core rod 9 happening during the downward movement of the clamping cylinder 608, at this time, the lower outer edge of the clamping cylinder 608 and the lower outer edge of the lower grinding head 808 being positioned above the semi-product;

S15. the auxiliary head 704 driving the core rod 9 to move upwards, the lower outer edge of the clamping cylinder 608 and the lower outer edge of the lower grinding head 808 jointly functioning to fall a product removed with margins onto the motor platform 501 from the core rod 9;

S16. the air-blowing apparatus 12 starting to operate to blow the product to the product-collecting box 10;

S17. after the auxiliary apparatus 7 driving the core rod 9 to reset downward, the electromagnetic apparatus 705 stopping operating, the clamping apparatus 6, the auxiliary apparatus 7 and the margin-removing apparatus 8 returning to the position at no operation; and S18. repeating S2~S18 to enable multiple semi-products to be continuously automatically removed with margins.

This example has the following advantages:

(1) It has high removal accuracy that is adjustable. In the device and method for removing margins provided in this example, the motor assembly 5 drives the products to rotate, when the products are positioned in the outer margin-removing zone 902, the outer margins of the products are removed by the lower grinding head 808 with a certain roughness: when the products are positioned in the inner margin-removing zone 903, the products are pressed by the upper grinding head 807, and the inner margins of the products are removed by the inner margin-removing zone 903 with a certain roughness.

(2) The device and method for removing margins provided in this example are controlled by the force sensor 809 behind the upper grinding head 807 and the lower grinding head 808 to control the removal accuracy, ensuring high removal accuracy during removing margins without damage to the rubber product substrate. Moreover, the feedback signal of the force sensor 809 is adjusted for different requirements for removal accuracy to effect adjusting the varied removal accuracy.

(3) This example has a high degree of automation, and the removal effect is stable.

Example 2

Compared with Example 1, the device for automatically removing margins of rubber sealing rings in high-accuracy provided by this example has differences as follows.

In this example, the four corners of the installation platform 4 are provided with support posts, and further, the bottoms of the support columns are provided with height-adjustable stand bars, and further, the support posts are made of 4040 aluminum section bars.

In this example, the middle of the installation platform 4 is provided with an opening fitting with the motor platform 501.

In this example, the installation platform 4 is provided with a plurality of threaded mounting holes, by which the product-conveying belt 2, the buffer conveyor belt 3, the clamping apparatus 6, the auxiliary apparatus 7 and the margin-removing apparatus 8 are all installed with bolt joint on the installation platform 4.

In this example, the motor body 504 is a speed-adjustable brushless motor, at one end of the output shaft of which the motor platform 501 is arranged. The upper plane of the motor platform 501 is coplanar with the upper plane of the installation platform 4.

In this example, the motor magnet 502 and the core rod magnet 905 are both a rubidium magnet, and the number of the motor magnet 502 and the core rod magnet 905 are each three, which respectively form an equilateral triangle distribution.

In this example, the core rod 9 pertains to a core rod group having the outer diameters varying with the inner diameters of the corresponding rubber ring products, and the position of the core rod magnet 905 in each core rod remains unchanged.

In this example, the core rod 9 is made of ferromagnetic material, and the top of the upper zone 901 is provided with a platform, the diameter of which is smaller than the diameter of the main portion of the core rod 9. The upper zone 901 is tapered at its top in its entirety, facilitating the arrangement of the clamping cylinder 608, so as to clamp the delivered products.

In this example, the diameter of the outer margin-removing zone 902 is larger than the inner diameter of the corresponding rubber ring, and gradually increases slightly from top to bottom, functioning to facilitate clamping the rubber ring.

In this example, the diameter of the inner margin-removing zone 903 is larger than the inner diameter of the corresponding rubber ring, and the inner margin-removing zone 903 has knurling, so as to facilitate processing and the removal of inner margins of the rubber ring.

In this example, the clamping cylinder 608 is a 32D two-claw cylinder, so as to clamp the rubber ring by means of the clamping piece fixed on the two-claw cylinder.

In this example, the top of the upper grinding head 807 is a smooth metal head, functioning to during positioning the rubber ring product in the inner margin-removing zone 903, compact the outside of the rubber ring product, so as to provide positive pressure and assist in removing the inner margins of the rubber ring.

In this example, the top of the lower grinding head 808 is a smooth metal head, functioning to during positioning the rubber ring product in the outer margin-removing zone 902, compact the outside of the rubber ring product, so as to provide positive pressure and assist in removing the outer margins of the rubber ring.

In this example, the product-conveying belt 2 is jointly controlled by the PLC and the first photoelectric sensor 13, and driven by its own built-in motor, having one end cooperating with the vibrating plate 1, and the other end cooperating with the buffer conveyor belt 3. The buffer conveyor belt 3 is jointly controlled by the PLC and the second photoelectric sensor 14.

In this example, the method of feeding products is as follows. After the vibrating plate 1 starts to operates, the products are delivered along the material flow channel 102 to the product-conveying belt 2, afterwards they continue to be delivered to the buffer conveyor belt 3 under the driving motion of the product-conveying belt 2. When the first photoelectric sensor 13 senses the products, the vibrating plate 1 and the product-conveying belt 2 stop operating, and the buffer conveyor belt 3 continues to operate. When the second photoelectric sensor 14 senses the products, the buffer conveyor belt 3 stops operating, and the products are delivered to a fixed position, so that the clamping cylinder 608 can grab them.

In this example, the product-collecting box 10 is supported by a support and adjusted to a suitable height. The side wall of one side of the product-collecting box 10 close to the core rod 9 is at the same height as the upper surface of the installation platform 4. The side wall of one side of the product-collecting box 10 far away to the core rod 9 and side walls of other two sides are at higher height than the upper surface of the installation platform 4.

In this example, the air-pumping apparatus 11 and the air-blowing apparatus 12 are fixed at the lower part of the auxiliary apparatus 7, and the air-pumping apparatus 11 is positioned at the upper part of the air-blowing apparatus 12. The air-pumping apparatus 11 functions to pump out flying chips generated during removing margins. The air-blowing apparatus 12 functions to blow the products remove with margins into the product-collecting box 10.

What is claimed is:

1. A device for automatically removing margins of rubber sealing rings, comprising a vibrating plate, an installation platform, a motor assembly and a core rod, wherein said vibrating plate and said installation platform are connected with each other and arranged on the ground;

said motor assembly is arranged on a lower part of said installation platform;

said core rod is arranged above said motor assembly, said core rod is a metal rod and comprises ferromagnetic material, the core rod comprises an upper zone, and an entirety of the upper zone is tapered;

a clamping apparatus, an auxiliary apparatus and a margin-removing apparatus are arranged beside said core rod;

both said clamping apparatus and said margin-removing apparatus are a linear sliding platform mechanism with two degrees of freedom in an X-axis and a Z-axis;

said auxiliary apparatus is a linear sliding platform mechanism in a Z-axis;

a product-conveying belt and a buffer conveyor belt are arranged on said installation platform; said product-conveying belt and said buffer conveyor belt are positioned between said vibrating plate and said core rod;

a first photoelectric sensor is arranged beside said product-conveying belt; a second photoelectric sensor is arranged beside said buffer conveyor belt;

a product-collecting box is also arranged beside said core rod, and a first baffle and a second baffle are arranged on both sides of said product-collecting box and said core rod;

one side of said core rod distal to said product-collecting box is further provided with an air-pumping apparatus and an air-blowing apparatus.

2. The device for automatically removing margins of rubber sealing rings according to claim 1, wherein said vibrating plate includes a top disc, a bottom disc and a base, which are arranged in order from top to bottom, and a material flow channel is arranged on said top disc.

3. The device for automatically removing margins of rubber sealing rings according to claim 1, wherein said motor assembly includes a motor platform, a motor connecting apparatus and a motor body; said motor platform is arranged in an opening of said installation platform; said motor body is positioned below said motor platform, and installed and fixed on said installation platform by means of said motor connecting apparatus, which is composed of two L-shaped connecting pieces.

4. The device for automatically removing margins of rubber sealing rings according to claim 1, wherein said core rod includes, from top to bottom, the tapered upper zone, an outer margin-removing zone, an inner margin-removing zone and a lower zone, a core rod magnet is arranged inside said lower zone and used to cooperate with a motor magnet of the motor assembly.

5. The device for automatically removing margins of rubber sealing rings according to claim 1, wherein said clamping apparatus includes a first Z-axis sliding rail, a first X-axis sliding rail, a clamper mounting seat, a clamping cylinder connecting plate and a clamping cylinder;

said first Z-axis sliding rail is a sliding rail arranged in the vertical direction, and installed and fixed on said installation platform by means of said clamper mounting seat, a first Z-axis motor is arranged at the top of said first Z-axis sliding rail;

said first X-axis sliding rail is a sliding rail arranged in a horizontal direction, and installed on said first Z-axis sliding rail, one end of said first X-axis sliding rail distal to said core rod is provided with a first X-axis motor, a first X-axis sliding block is further arranged on said first X-axis sliding rail, said clamping cylinder is fixed on said first X-axis sliding block by means of said clamping cylinder connecting plate;

said first X-axis sliding rail is driven by said first Z-axis motor and can move up and down along said first Z-axis sliding rail, said clamping cylinder is driven by said first X-axis motor and can move left and right along said first X-axis sliding rail.

6. The device for automatically removing margins of rubber sealing rings according to claim 1, wherein said auxiliary apparatus includes an auxiliary sliding rail, an auxiliary head connecting plate, an auxiliary head, an electromagnetic apparatus, a rotary disc and an auxiliary apparatus mounting seat;

said auxiliary sliding rail is a sliding rail arranged in a vertical direction, and installed and fixed on said installation platform by means of said auxiliary apparatus mounting seat, an auxiliary motor is arranged at the top of said auxiliary sliding rail;

said auxiliary head is installed on said auxiliary sliding rail by means of said auxiliary head connecting plate, and driven by said auxiliary motor to move up and down along said auxiliary sliding rail, said electromagnetic apparatus is arranged in the middle part of said auxiliary head, the lower part of said auxiliary head is provided with said rotary disc.

7. The device for automatically removing margins of rubber sealing rings according to claim 1, wherein said margin-removing apparatus includes a second Z-axis sliding rail, a second X-axis sliding rail, a second X-axis sliding block, a grinding head connecting block, an upper grinding head, a lower grinding head, a force sensor, and a margin-removing installation seat;

said second Z-axis sliding rail is a slide rail arranged in the vertical direction, and installed and fixed on said installation platform by means of said margin-removing installation seat, a second Z-axis motor is arranged at the top of said second Z-axis sliding rail;

said second X-axis sliding rail is a sliding rail arranged in a horizontal direction, and installed on said second Z-axis sliding rail, one end of said second X-axis sliding rail distal to said core rod is provided with a second X-axis motor, said second X-axis sliding block is further arranged on said second X-axis sliding rail, both said upper grinding head and said lower grinding head are fixed on said second X-axis sliding block by means of said grinding head connecting block; and said second X-axis sliding rail is driven by said second Z-axis motor and can move up and down along said second Z-axis sliding rail, said force sensor controlling the positional accuracy of the grinding heads is arranged beside both said upper grinding head and said lower grinding head, said second X-axis sliding block is driven by said second X-axis motor and can move left and right along said second X-axis sliding rail.

\* \* \* \* \*